United States Patent
Meng et al.

(10) Patent No.: US 11,108,736 B2
(45) Date of Patent: Aug. 31, 2021

(54) SEPARATING CGN FORWARDING AND CONTROL

(71) Applicant: NEW H3C TECHNOLOGIES CO., LTD., Hangzhou (CN)

(72) Inventors: Dan Meng, Beijing (CN); Hongshu Shi, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/615,395

(22) PCT Filed: May 15, 2018

(86) PCT No.: PCT/CN2018/086864
§ 371 (c)(1),
(2) Date: Nov. 20, 2019

(87) PCT Pub. No.: WO2018/214784
PCT Pub. Date: Nov. 29, 2018

(65) Prior Publication Data
US 2020/0162422 A1    May 21, 2020

(30) Foreign Application Priority Data

May 24, 2017 (CN) .......................... 201710373090.2

(51) Int. Cl.
*H04L 9/12* (2006.01)
*H04L 29/12* (2006.01)
(Continued)

(52) U.S. Cl.
CPC .......... *H04L 61/2592* (2013.01); *H04L 45/74* (2013.01); *H04L 61/2514* (2013.01);
(Continued)

(58) Field of Classification Search
CPC . H04L 61/2592; H04L 45/74; H04L 61/2514; H04L 61/2517; H04L 61/2521;
(Continued)

(56) References Cited

U.S. PATENT DOCUMENTS 8,289,968 B1    10/2012  Zhuang
8,942,235 B1 *  1/2015  Vinapamula Venkata ...................
                                                        H04L 61/203
                                                           370/392
(Continued)

FOREIGN PATENT DOCUMENTS

CN    103139326 A    6/2013
CN    104158745 A   11/2014
(Continued)

OTHER PUBLICATIONS

Donley, C. et al., "Deterministic Address Mapping to Reduce Logging in Carrier Grade NAT Deployments," IETF Website, Available Online at https://tools.ietf.org/html/draft-donley-behave-deterministic-cgn-04, Jul. 11, 2012, 14 pages.
(Continued)

*Primary Examiner* — Ramy M Osman

(57) ABSTRACT

By splitting CGN functions based on a control plane and a forwarding plane, a CGN control plane function is put into a BRAS CP device, and a CGN forwarding plane function is retained on a CGN card on the BRAS DP device, and CGN configuration information is distributed by the BRAS CP device to the BRAS DP device.

12 Claims, 5 Drawing Sheets

(51) Int. Cl.
*H04L 12/741* (2013.01)
*H04L 29/06* (2006.01)

(52) U.S. Cl.
CPC ...... *H04L 61/2517* (2013.01); *H04L 61/2521* (2013.01); *H04L 63/0892* (2013.01)

(58) Field of Classification Search
CPC ............. H04L 63/0892; H04L 61/2528; H04L 61/2535; H04L 45/14; H04L 61/2582
See application file for complete search history.

(56) References Cited

U.S. PATENT DOCUMENTS

| | | | | |
|---|---|---|---|---|
| 8,953,592 | B2* | 2/2015 | Krishna | H04L 61/2514 370/389 |
| 9,351,324 | B2* | 5/2016 | Krishna | H04L 61/2528 |
| 9,614,761 | B1* | 4/2017 | Kamisetty | H04L 61/2517 |
| 10,129,207 | B1* | 11/2018 | Wan | H04L 61/255 |
| 10,979,246 | B2* | 4/2021 | Boutros | H04L 45/64 |
| 2008/0285577 | A1* | 11/2008 | Zisapel | H04L 67/104 370/409 |
| 2009/0144442 | A1* | 6/2009 | Zheng | H04L 12/2878 709/236 |
| 2014/0092899 | A1* | 4/2014 | Krishna | H04L 61/203 370/389 |
| 2015/0071225 | A1 | 3/2015 | Krishna et al. | |
| 2016/0072766 | A1* | 3/2016 | Jain | H04L 61/2532 709/228 |
| 2016/0164835 | A1* | 6/2016 | Hoffmann | H04L 45/64 726/1 |
| 2016/0197799 | A1 | 7/2016 | Clemm et al. | |
| 2018/0167320 | A1 | 6/2018 | Huang et al. | |
| 2018/0331921 | A1* | 11/2018 | Lin | H04L 45/745 |
| 2019/0222434 | A1* | 7/2019 | Ye | H04L 61/2015 |
| 2020/0119941 | A1* | 4/2020 | Chen | H04L 61/2015 |
| 2020/0162422 | A1* | 5/2020 | Meng | H04L 45/14 |

FOREIGN PATENT DOCUMENTS

| | | |
|---|---|---|
| CN | 104954239 A | 9/2015 |
| CN | 105791448 A | 7/2016 |
| CN | 107769973 A | 3/2018 |
| WO | 2016202269 A2 | 12/2016 |

OTHER PUBLICATIONS

ISA State Intellectual Property Office of the People's Republic of China, Written Opinion of the International Searching Authority Issued in Application No. PCT/CN2018/086864, dated Aug. 1, 2018, WIPO, 3 pages.
European Patent Office, Extended European Search Report Issued in Application No. 18806419.0, dated Feb. 14, 2020, Germany, 8 pages.
ISA State Intellectual Property Office of the People's Republic of China, International Search Report Issued in Application No. PCT/CN2018/086864, dated Aug. 1, 2018, WIPO, 4 pages.
State Intellectual Property Office of the People's Republic of China, Office Action and Search Report Issued in Application No. 201710373090.2, dated Apr. 1, 2019, 9 pages. (Submitted with Partial Translation).
Japanese Patent Office, Office Action Issued in Application No. 2019-564865, dated Nov. 10, 2020, 10 pages. (Submitted with Machine Translation).
European Patent Office, Office Action Issued in Application No. 18806419.0, dated Dec. 2, 2020, Germany, 6 pages.

* cited by examiner

SEPARATING CGN FORWARDING AND CONTROL

CROSS-REFERENCE TO RELATED APPLICATIONS

The present application is a U.S. National Phase of International Patent Application Serial No. PCT/CN2018/086864 entitled "SEPARATION OF FORWARDING PLANE AND CONTROL PLANE OF CGN," filed on May 15, 2018. International Patent Application Serial No. PCT/CN2018/086864 claims priority to Chinese Patent Application No. 201710373090.2 filed on May 24, 2017. The entire contents of each of the above-cited applications are hereby incorporated by reference in their entirety for all purposes.

BACKGROUND

Since a control plane and a forwarding plane (or referred to as a data plane) of a network device may have a capability mismatch, dispersed control resources, a closed hardware architecture, a long deployment period for new service etc., it is desired to reconstruct a Metropolitan Area Network. Correspondingly, it is also desired to perform architecture adjustment for a broadband remote access server (BRAS) serving as one of important components of the Metropolitan Area Network. Control functions such as BRAS authentication may be separated out and realized on the control plane based on a principle of "control aggregation, high efficient forwarding, simple interaction and elastic scalability". In this way, functional requirements of the forwarding plane are simplified so that a new metropolitan area network that is based on Software Defined Network (SDN)/Network Function Virtualization (NFV) architecture and features a high resource utilization rate, dynamic scalability and interface standardization is realized.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

To separate a forwarding plane and a control plane of a BRAS, a single BRAS device may be split into a BRAS Control Plane (CP) device and a BRAS Data Plane (DP) device where the BRAS CP device is a network device that enables a BRAS control plane function and the BRAS DP device is a network device that enables a BRAS forwarding plane function.

Due to shortage of public network address resources, in most cases, an Internet Protocol (IP) address which is assigned to a user terminal having been authenticated is a private network address. When the user terminal accesses an external network, the private network address is desired to be translated into a public network address. A Carrier-Grade Network Address Translation (CGN) device is usually employed to realize the translation function. The CGN device may be arranged on a BRAS device in the form of a CGN card. When the BRAS evolves to an architecture with separated forwarding and control, the CGN card is also desired to be adjusted to ensure normal functions of CGN.

For persons skilled in the art to better understand the technical solutions of the examples of the present disclosure and make the above objective, features and advantages of the present disclosure more apparent and understandable, the technical solutions of examples of the present disclosure will be further explained in combination with the accompanying drawings.

In an example, corresponding to a BRAS architecture with forwarding and control functions separated, CGN functions may also be split based on a control plane and a forwarding plane so that functions of the CGN control plane may be put into the BRAS CP device and functions of the CGN forwarding plane may be retained on the CGN card deployed on the BRAS DP device.

Figure 1:
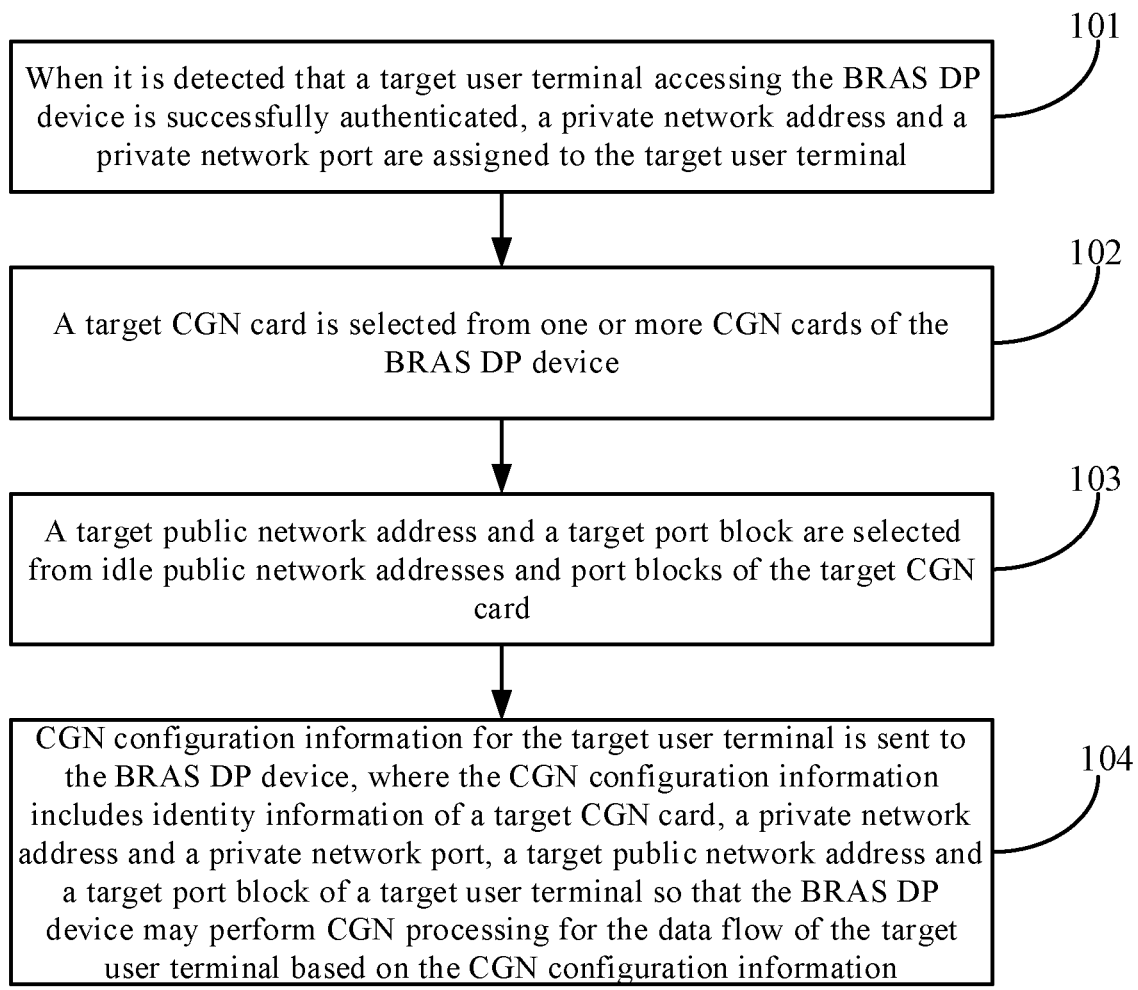
FIG. 1 is a flowchart illustrating a method of separating CGN forwarding and control according to an example of the present disclosure.

FIG. 1 is a flowchart illustrating a method of separating CGN forwarding and control according to an example of the present disclosure. The method may be applied to the BRAS CP device. As shown in FIG. 1, the method may include the following blocks.

At block 101, when it is detected that a target user terminal accessing the BRAS DP device is successfully authenticated, a private network address and a private network port are assigned to the target user terminal.

In some examples, the target user terminal may not refer to a particular user terminal, but refer to a user terminal used by any PPPOE user or Internet Protocol over Ethernet (IPOE) user to access a BRAS network.

In an example, when the target user terminal requests access to an external network, the BRAS DP device may identify a protocol packet sent by the target user terminal and send the protocol packet to the BRAS CP device. Unless otherwise indicated subsequently, the protocol packet in the example refers to a protocol packet used by the target user terminal to request access to the external network.

When receiving the protocol packet, the BRAS CP device may establish a user session entry and initiate an authentication request of the target user terminal to an Authentication, Authorization and Accounting Server (AAA Server) and the AAA server may then perform authentication for the target user terminal. When the authentication is successful, the BRAS CP device may assign a private network address and a private network port to the target user terminal.

At block 102, a target CGN card is selected from one or more CGN cards of the BRAS DP device.

In an example, when receiving the above protocol packet, the BRAS CP device may select the target CGN card from one or more CGN cards of the BRAS DP device where the target CGN card is used to process a data flow of the target user terminal.

For example, it is assumed that a Virtual Extensible Local Area Network (VXLAN) tunnel is established between the BRAS DP device and the BRAS CP device. When receiving the protocol packet from the target user terminal, the BRAS DP device may perform VXLAN encapsulation for the protocol packet and the format of encapsulated VXLAN packet is as shown in Table 1, where a source IP address of an outer-layer IP header is an IP address of the BRAS DP device and a destination IP address is an IP address of the BRAS CP device. When receiving the VXLAN packet, the BRAS CP device may determine from which BRAS DP device the VXLAN packet is sent based on the source IP address of the outer-layer IP header, that is, determine the BRAS DP device accessed by the target user terminal.

TABLE 1

| Outer-layer IP header | Outer-layer UDP header | VXLAN header | Raw layer-2 data frame |
| --- | --- | --- | --- |

In an example, after the target BRAS DP device accessed by the target user terminal is determined, the BRAS CP device may determine the number of CGN cards in the target BRAS DP device. When there is only one CGN card, the BRAS CP device may determine the CGN card as the target CGN card; when there are a plurality of CGN cards, the BRAS CP device may select one CGN card from the plurality of the CGN cards as the target CGN card.

The number of the CGN cards may be preconfigured in the BRAS CP device and may also be obtained by the BRAS CP device from the BRAS DP device in real time.

In an example, when there are a plurality of CGN cards in the BRAS DP device, the BRAS CP device may select the target CGN card from the plurality of CGN cards in a polling manner so as to balance loads of different CGN cards.

After the target CGN card is determined by the BRAS CP device, the BRAS DP device may redirect a data flow (a data flow sent by the target user terminal or a data flow sent to the target user terminal) received from the target user terminal, to the target CGN card for address translation.

In an example, when a target CGN card is selected, the BRAS CP device may also assign data flows from user terminals which access the BRAS DP device via a same physical interface to a same CGN card, so as to simplify the redirection configuration on the BRAS DP device.

In an example, after the BRAS CP device selects the target CGN card from the CGN cards of the BRAS DP device in a polling manner, the method of separating CGN forwarding and control may also include:

recording a corresponding relationship between a target interface and the selected CGN card where the target user terminal accesses the BRAS DP device via the target interface on the BRAS DP device; and when it is detected that another user terminal accessing the BRAS DP device via the target interface is successfully authenticated, selecting the target CGN card includes: selecting a CGN card corresponding to the target interface as the target CGN card based on the corresponding relationship.

In an example, for any interface on the BRAS DP device, when the interface is accessed by a user terminal for the first time, the BRAS CP device may select a target CGN card for the user terminal in a polling manner after the user terminal is successfully authenticated and may record a corresponding relationship between the interface and the target CGN card. Further, when the interface is accessed by another target user terminal and the other target user terminal is successfully authenticated, the BRAS CP device may select a target CGN card based on the recorded corresponding relationship between interfaces and CGN cards to process data flow from the other target user terminal.

In an example, a corresponding relationship between an interface via which a user terminal accesses the BRAS DP device and a CGN card may be statically preconfigured on the BRAS CP device. Thus, when it is required to select a CGN card for a user terminal, the BRAS CP device may complete the selection based on the preconfigured corresponding relationship between the interface and the CGN card rather than by polling, so that data flows of user terminals accessing a same interface can be assigned to a same CGN card for processing.

For example, it is assumed that three CGN cards, i.e. CGN cards 1-3, are deployed on the BRAS DP device and the BRAS DP device includes six user-side physical interfaces (physical interfaces 1-6). To balance loads of CGN cards, the data flows of user terminals accessing the physical interfaces 1-2 may be assigned to CGN card 1, the data flows of user terminals accessing the physical interfaces 3-4 may be assigned to the CGN card 2 and the data flows of user terminals accessing the physical interfaces 5-6 may be assigned to the CGN card 3. Correspondingly, a CPU of the BRAS DP device may generate a redirection rule shown in Table 2 and store the redirection rule in a forwarding chip.

TABLE 2

| Matching item | Action item |
| --- | --- |
| Ingress interface: physical interface 1 or 2 | Redirect to CGN card 1 |
| Ingress interface: physical interface 3 or 4 | Redirect to CGN card 2 |
| Ingress interface: physical interface 5 or 6 | Redirect to CGN card 3 |

Next, the BRAS DP device may determine a redirection rule corresponding to the interface via which the user terminal accesses the BRAS DP device so as to reduce hardware resources consumption for redirection.

At block 103, a target public network address and a target port block are selected from idle public network addresses and port blocks of the target CGN card.

In an example, the BRAS CP device may assign public network addresses to different CGN cards of the BRAS DP device as required in order to improve a utilization rate of public network addresses.

In an example, before selecting the target public network address and the target port block from the idle public network addresses and the port blocks of the target CGN card, the following processes may also be included:

11) determining whether there is an idle public network address(es) and port block (s) on the target CGN card;

12) selecting a target public network address and a target port block from the idle public network address(es) and the port block (s) of the target CGN card if yes; and 13) selecting and assigning idle public network addresses from a public network address pool for the target CGN card based on a pre-configured allocation granularity and assigning port blocks corresponding to the selected idle public network addresses to the target CGN card if no.

In an example, a public network address range of CGN and the allocation granularity, based on which the BRAS CP device may assign public network addresses to a CGN card, may be preconfigured on the BRAS CP device. The allocation granularity refers to a number of public network addresses assigned by the BRAS CP device to a CGN card at one time.

If no idle public network address and block port exist on the target CGN card, that is, the public network addresses and port blocks on the target CGN card are consumed up, the BRAS CP device may firstly select idle public network addresses from the public network address pool for the target CGN card based on the allocation granularity and then assign port blocks corresponding to the selected idle public network addresses to the target CGN card. Then, the BRAS CP device may select a target public network address and a target port block from the idle public network addresses and the port blocks assigned to the target CGN card.

At block 104, CGN configuration information for the target user terminal is sent to the BRAS DP device. The CGN configuration information may include identity information of a target CGN card, a private network address and a private network port, a target public network address and a target port block of a target user terminal, so that the BRAS DP device may perform CGN processing for the data flow of the target user terminal based on the CGN configuration information.

In an example, the above CGN configuration information may be carried in a user flow table for a target user terminal and distributed to a target BRAS DP device by the BRAS CP device. The user flow table may also include the above CGN configuration information as well as information such as layer-2 forwarding information, layer-3 forwarding information, ingress interface, Virtual Routing Forwarding (VRF) and QoS strategy, for ensuring normal processing on the BRAS forwarding plane.

When receiving the user flow table of the target user terminal from the BRAS CP device, the target BRAS DP device may obtain the CGN configuration information carried in the user flow table.

After obtaining the CGN configuration information, the target BRAS DP device may perform CGN processing for the data flow of the target user terminal based on the CGN configuration information. The specific processing flow may be seen in related description about the flow of the method shown in FIG. 2.

Figure 2:
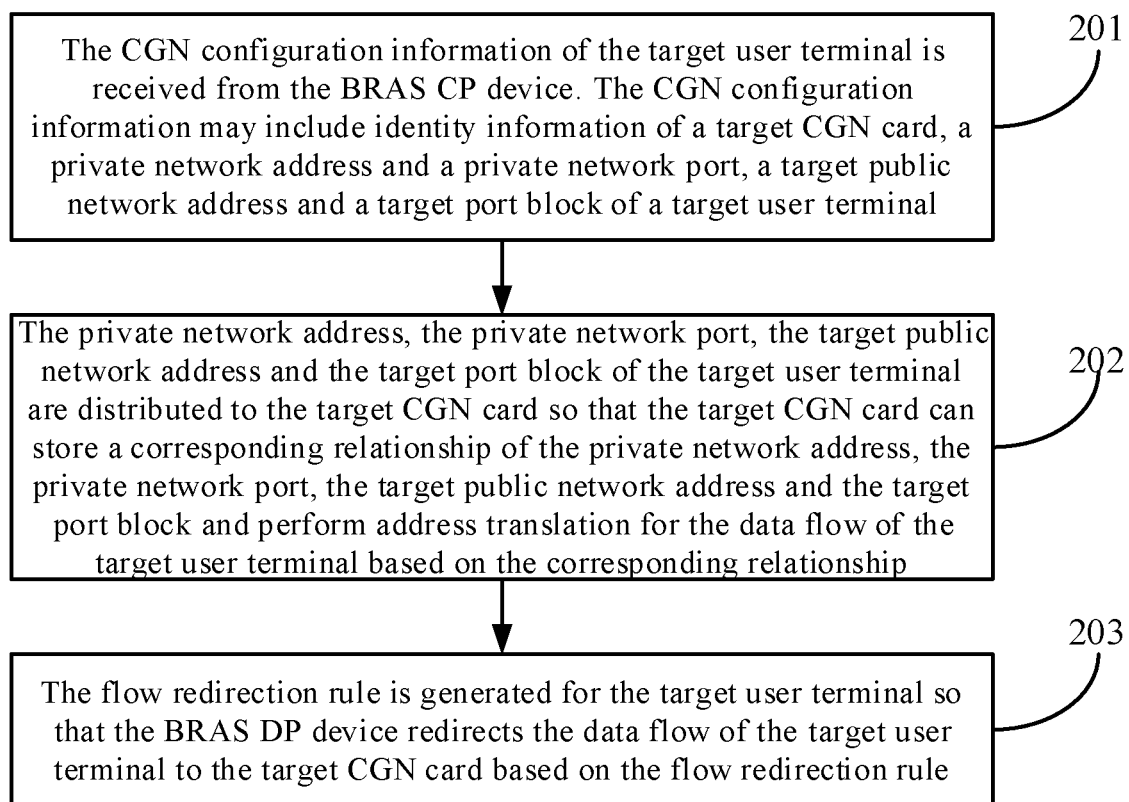
FIG. 2 is a flowchart illustrating a method of separating CGN forwarding and control according to an example of the present disclosure.

FIG. 2 is a flowchart illustrating a method of separating CGN forwarding and control according to an example of the present disclosure. The method may be applied to the BRAS DP device. One or more CGN cards may be deployed on the BRAS DP device. As shown in FIG. 2, the method may include the following blocks.

At block 201, the CGN configuration information for the target user terminal is received from the BRAS CP device. The CGN configuration information includes identity information of a target CGN card, a private network address and a private network port, a target public network address and a target port block of a target user terminal.

In an example, when the target user terminal requests access to an external network, the BRAS DP device may identify a protocol packet sent by the target user terminal and send the protocol packet to the BRAS CP device.

Processing flow after the BRAS CP device receives the protocol packet sent when the target user terminal requests access to an external network may be seen in related description of the flow of the method shown in FIG. 1.

In an example, the specific implementation for the BRAS CP device to distribute the CGN configuration information for the target user terminal to the BRAS DP device may be seen in related description of the flow of the method shown in FIG. 1.

At block 202, the private network address, the private network port, the target public network address and the target port block of the target user terminal are distributed to the target CGN card so that the target CGN card can store a corresponding relationship of the private network address, the private network port, the target public network address and the target port block and perform address translation for the data flow of the target user terminal based on the corresponding relationship.

At block 203, the flow redirection rule is generated for the target user terminal so that the BRAS DP device redirects the data flow of the target user terminal to the target CGN card based on the flow redirection rule.

In an example, when the BRAS DP device receives the CGN configuration information for the target user terminal from the BRAS CP device, the BRAS DP device may perform the following operations. On one hand, the BRAS DP device may distribute the private network address, the private network port, the target public network address and the target port block of the target user terminal to the target CGN card based on the identity information of the target CGN card included in the CGN configuration information. On the other hand, the BRAS DP device may generate the flow redirection rule for the target user terminal. The flow redirection rule is used to instruct the BRAS DP device to redirect the received flow data of the target user terminal to the target CGN card so that the CGN card can perform address translation for the data flow of the target user terminal based on the above private network address, the private network port, the target public network address and the target port block.

In an example of the present disclosure, the data flow of a target user terminal includes a data flow sent by the target user terminal and a data flow sent to the target user terminal, where the data flow sent by the target user terminal refers to a data flow (upstream data flow of the target user terminal) with a source IP address and a source port being the private network address and the private network port of the target user terminal respectively; and the flow data sent to the target user terminal refers to a data flow (downstream data flow of the target user terminal) with a destination IP address and a destination port being the target public network address and the target port (any port of the target port block).

When receiving the private network address, the private network port, the target public network address and the target port block of the target user terminal distributed by the BRAS DP device, the target CGN card may store the corresponding relationship of the private network address, the private network port, the target public network address and the target port block of the target user terminal. Further, when receiving the data flow with the source IP address and the source port being the private network address and the private network port of the target user terminal respectively, the target CGN card may replace the source IP address and the source port of the data flow with the target public network address and the target port (the target CGN card selects the target port from the target port block); when receiving the flow data with the destination IP address and the destination port being the target public network address and the target port, the target CGN card may replace the destination IP address and the destination port of the data flow with the private network address and the private network port of the target user terminal.

In an example, there is no certain sequence relationship between blocks 202-203, that is, block 202 may be performed before block 203 based on the description of the above method example, or block 203 may be performed before block 202. The specific implementation is not repeated herein.

It can be seen that according to the flow of the method shown in FIGS. 1 and 2, the CGN functions may be split based on a control plane and a forwarding plane so that functions of the CGN control plane may be put into the BRAS CP device and functions of the CGN forwarding plane may be retained on the CGN card deployed on the BRAS DP device. CGN-related configurations may be distributed to the BRAS DP device by the BRAS CP device, which improves the efficiency and accuracy of the CGN configurations, compared with an existing CGN implementation solution in which a user needs to repeat similar configuration operations for each of the CGN cards.

Further, the BRAS CP device may assign public network addresses to the CGN cards in the BRAS DP device as required, which improves a utilization rate of the public network addresses compared with an existing CGN implementation solution in which manual planning and configuration needs to be performed for each CGN card based on a predicated number of users accessing the BRAS.

For persons skilled in the art to better understand the technical solutions of the present disclosure, the technical solutions of the present disclosure will be illustrated in combination with a specific application scenario.

Figure 3:
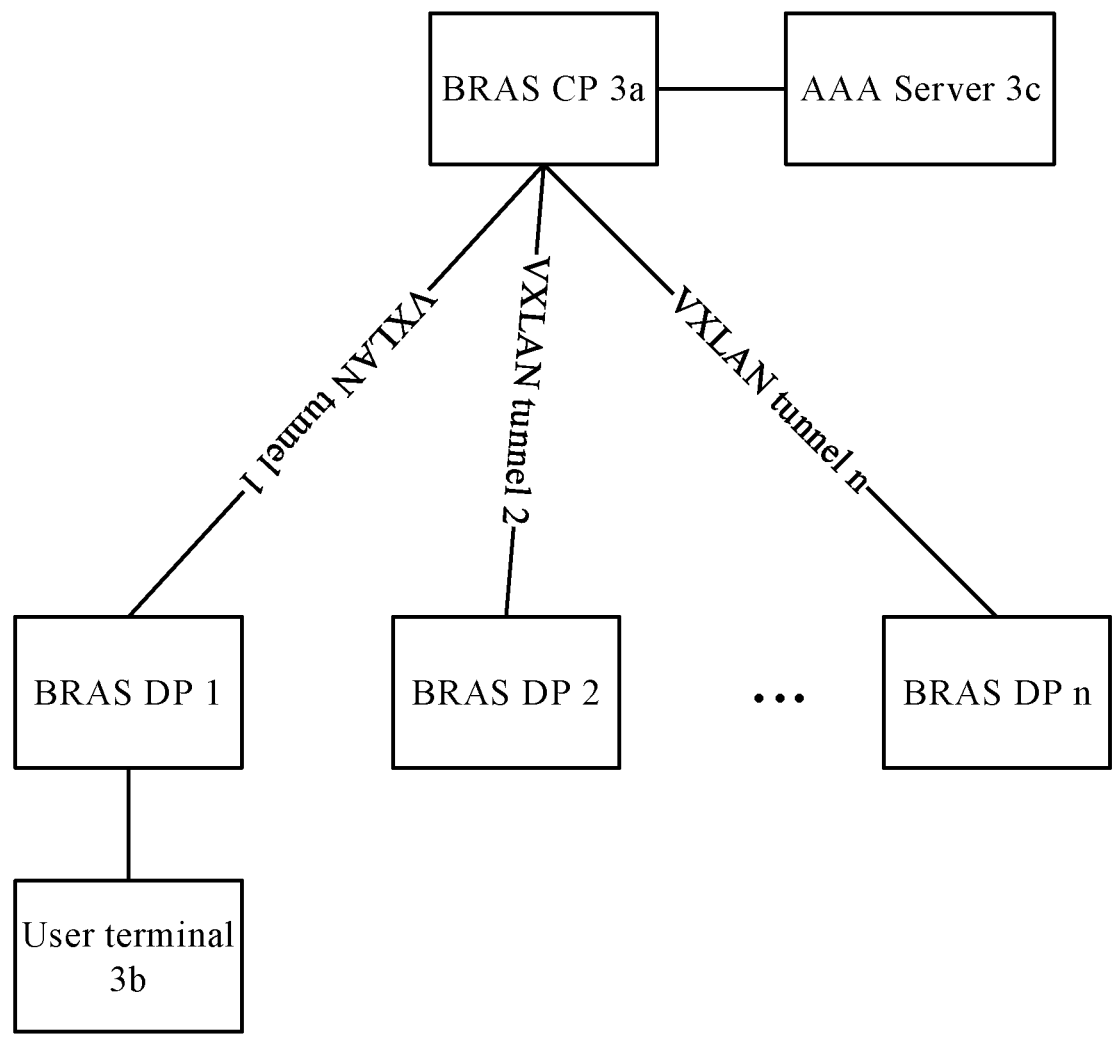
FIG. 3 is a schematic diagram illustrating an architecture of an application scenario according to an example of the present disclosure.

FIG. 3 is a schematic diagram illustrating an architecture of an application scenario according to an example of the present disclosure. In the application scenario shown in FIG. 3, take that one BRAS CP device corresponds to a plurality of BRAS DP devices as an example. An IP address of a BRAS CP device 3a is IP0 and IP addresses of BRAS DP devices (BRAS DP 1~BRAS DP n) are IP 1~IP n respectively; a VXLAN tunnel (VXLAN tunnel 1~VXLAN tunnel n respectively) is established between the BRAS CP device 3a and each of the BRAS DP devices.

Based on the application scenario shown in FIG. 3, a method of separating CGN forwarding and control according to an example of the present disclosure may include the following processes.

1. A public network address range and an allocation granularity for assigning public network addresses each time may be configured on the BRAS CP device 3a.

2. A PPPOE/IPOE user goes online through a user terminal (for example, a user terminal 3b). The BRAS DP 1 receives a protocol packet of the user terminal 3b going online and performs VXLAN encapsulation for the protocol packet with a source IP address of an outer-layer IP header of the VXLAN encapsulation being IP1 and a destination IP address being IP0 and then sends the encapsulated packet to the BRAS CP device 3a via the VXLAN tunnel 1.

3. When receiving the protocol packet, the BRAS CP device 3a may establish a corresponding user session entry and start interactive authentication with an AAA server 3c. When the authentication succeeds, the BRAS CP device 3a may assign a private network address (for example, IP s1) and a private network port (for example, port1) to the user terminal 3b.

4. The BRAS CP device 3a may determine the BRAS DP device accessed by the user terminal 3b as the BRAS DP 1 according to the source IP address (IP 1) of the outer-layer IP header of the VXLAN encapsulation of the received protocol packet. Further, the BRAS CP device 3a may obtain the number of the CGN cards in the BRAS DP 1.

In an example, it is assumed that the BRAS CP device 3a records the number of CGN cards in each of the BRAS DP devices BRAS DP 1~BRAS DP n. After determining the BRAS DP device accessed by the user terminal 3b, the BRAS CP device 3a may locally query the number of CGN cards in the BRAS DP device.

In an example, it is assumed that three CGN cards (i.e. CGN cards 1-3) are deployed on the BRAS DP 1.

5. The BRAS CP device 3a may select the target CGN card from the CGN cards in the BRAS DP 1 by polling.

In an example, it is assumed that the CGN card 1 on the BRAS DP 1 is selected by the BRAS CP device 3a for processing the data flow of the user terminal 3b.

After selecting the CGN card 1 from the BRAS DP 1 by polling, the BRAS CP device 3a may record a corresponding relationship between the CGN card 1 and an interface, for example, an interface 1, via which the user terminal 3b accesses the BRAS DP 1. When another user terminal accesses to the BRAS DP 1 via the interface 1 subsequently and is successfully authenticated, the BRAS CP device 3a may select the CGN card 1 based on the recorded corresponding relationship between the interface 1 and the CGN card 1 to process the data flow of the other user terminal so that the data flows of user terminals accessing a same interface can be assigned to a same CGN card.

6. The BRAS CP device 3a may determine whether the public network addresses and the port blocks on the CGN card 1 are consumed up; if yes, public network addresses may be selected from a CGN public network address pool for the CGN card 1 based on the preconfigured allocation granularity.

7. The BRAS CP device 3a may select the target public network address and the target port block from the idle public network addresses and the port blocks on the CGN card 1.

In an example, it is assumed the target public network address and the target port block assigned by the BRAS CP device 3a for the user terminal 3b are IP g1 and port1001~port1064 respectively.

8. The BRAS CP device 3a may distribute a user flow table containing CGN configuration information to the BRAS DP 1.

The user flow table may also include the CGN configuration information as well as critical contents such as layer-2 information, layer-3 information, ingress interface, VRF and QoS strategy for ensuring normal processing on the BRAS forwarding plane. The CGN configuration information includes identity information of the CGN card 1, the private network address (IP s1), the private network port (port 1), the target public network address (IP g1) and the target port block (port1001~port1064) of the user terminal 3b.

9. The BRAS DP 1 parses the contents of the user flow table so that layer-2 and layer-3 information of user carried in the user flow table can be converted into a hardware entry and then distributed to a forwarding chip and also the CGN configuration information contained therein may be distributed to the CGN card 1.

After receiving the CGN configuration information distributed by the BRAS DP 1, the CGN card 1 may store the corresponding relationship of private network address, the private network port, the target public network address and the target port block of the user terminal 3b with its format shown in Table 3.

TABLE 3

| Private network address | Private network port | Target public network address | Target port block |
|---|---|---|---|
| IP s1 | Port1 | IP g1 | Port1001~Port1064 |

10. The BRAS DP 1 may locally generate a flow redirection rule for the user terminal 3b and redirect data flow (data flow with the source IP address and the source port being IPs1 and port1 respectively) sent by the user terminal 3b and the data flow (data flow with the destination IP address and the destination port being IP g1 and port i (1001≤i≤1064) respectively) sent to the user terminal 3b to the CGN card 1 and also advertise a static routing corresponding to the IP g1.

11. When the CGN card 1 receives the data flow sent by the user terminal 3b, the source IP address and the source port of the data flow may be changed from IP s1 and port1 to IP g1 and port i respectively. The data flow with a changed address may be then re-sent to the forwarding chip of the BRAS DP device and then forwarded by the forwarding chip of the BRAS DP 1 based on a local forwarding entry. When the CGN card 1 receives the data flow sent to the user terminal 3b, the destination IP address and the destination port of the data flow may be changed from IP g1 and port i to IP s1 and port 1 and the data flow with a changed address may be re-sent to the forwarding chip of the BRAS DP device and then forwarded by the forwarding chip of the BRAS DP 1 based on a local forwarding entry.

It can be seen from the above description that in the technical solution of the present disclosure, by splitting CGN functions based on the control plane and the forwarding plane, functions of the CGN control plane may be put into the BRAS CP device and functions of the CGN forwarding plane may be retained on the CGN card deployed on the BRAS DP device. The CGN-related configurations may be distributed by the BRAS CP device to the BRAS DP device, which improves the efficiency and accuracy of the CGN configurations.

The above is a description of a method of the present disclosure. An apparatus of the present disclosure will be illustrated below.

Figure 4:
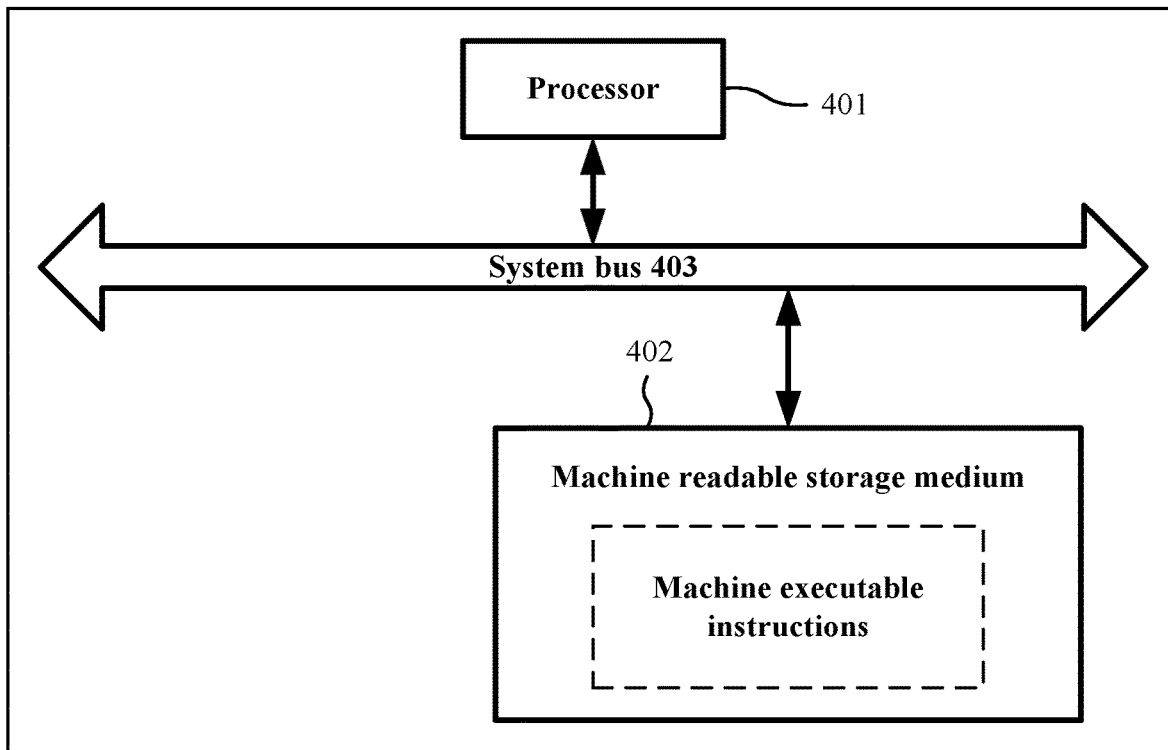
FIG. 4 is a schematic diagram illustrating a hardware structure of an apparatus for separating CGN forwarding and control according to an example of the present disclosure.

FIG. 4 is a schematic diagram illustrating a hardware structure of an apparatus for separating CGN forwarding and control according to an example of the present disclosure. The apparatus may include a processor 401 and a machine-readable storage medium 402 storing machine-executable instructions. The processor 401 and the machine-readable storage medium 402 may communicate via a system bus 403. Also, by reading and executing the machine executable instructions stored on the machine readable storage medium 402 and corresponding to a CGN control logic, the processor 401 may be caused to execute the method of CGN separating forwarding and control as described above.

The machine readable storage medium 402 mentioned herein may be any electronic, magnetic, optical or other physical storage devices and may contain or store information such as executable instructions, data and so on. For example, the machine readable storage medium may be volatile or non-volatile such as a Radom Access Memory (RAM), a flash memory, a storage drive (e.g. hard disk drive), a solid state hard disk, any type of storage disk (e.g., optical disk, Digital Video Disk (DVD)), or a similar storage medium, or a combination thereof.

Figure 5:
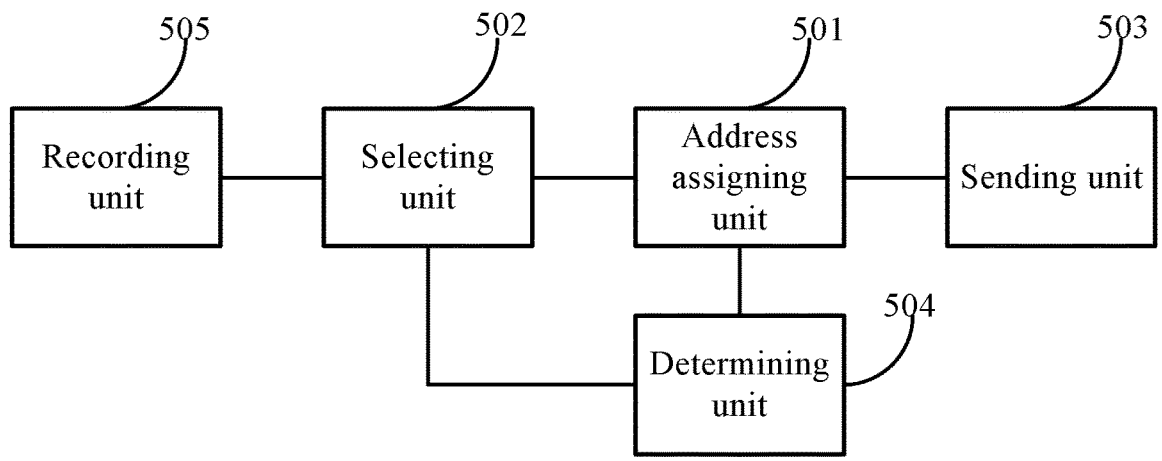
FIG. 5 is a schematic diagram illustrating a functional structure of a CGN control logic according to an example of the present disclosure.

As shown in FIG. 5, functionally, the above CGN control logic may include an address assigning unit 501, a selecting unit 502 and a sending unit 503.

The address assigning unit 501 is configured to assign a private network address and a private network port for a target user terminal when detecting that the target user terminal accessing a BRAS DP device is successfully authenticated.

The selecting unit 502 is configured to select a target CGN card from one or more CGN cards in the BRAS DP device.

The address assigning unit 501 is also configured to select a target public network address and a target port block from idle public network addresses and port blocks on the target CGN card.

The sending unit 503 is configured to send CGN configuration information for the target user terminal to the BRAS DP device where the CGN configuration information includes identity information of the target CGN card, the private network address, the private network port, the target public network address and the target port block so that the BRAS DP device performs CGN processing for data flow of the target user terminal based on the CGN configuration information.

In an example, the sending unit 503 may be specifically configured to send a user flow table for the target user terminal to the BRAS DP device where the CGN configuration information is carried in the user flow table.

In an example, the above CGN control logic also includes a determining unit 504.

The determining unit 504 is configured to determine whether there are idle public network addresses and port blocks on the target CGN card.

The address assigning unit 501 may be specifically configured to select the target public network address and the target port block from the idle public network addresses and the port blocks on the target CGN card if it is determined that there are the idle public network addresses and the port blocks on the target CGN card.

The address assigning unit 501 may be also configured to select and assign idle public network addresses for the target CGN card from a public network address pool based on a preconfigured allocation granularity and assign port blocks corresponding to the selected idle public network addresses to the target CGN card if there are no idle public network addresses and the port blocks on the target CGN card.

In an example, the selecting unit 502 may be specifically configured to select a target CGN card from CGN cards on the BRAS DP device in a polling manner when there are a plurality of CGN cards on the BRAS DP device.

In an example, the above CGN control logic may also include a recording unit 505.

The recording unit 505 is configured to record a corresponding relationship between a target interface and the selected CGN card, where the target user terminal accesses the BRAS DP device via the target interface on the BRAS DP device.

The selecting unit 502 is also configured to, when detecting that another target user terminal accessing the BRAS DP device via the target interface is successfully authenticated, select a target CGN card, including selecting a CGN card corresponding to the target interface as the target CGN card based on the corresponding relationship.

In an example, the sending unit 503 is specifically configured to send the user flow table of the target user terminal to the BRAS DP device so that the BRAS DP device obtains the CGN configuration information from the user flow table, distributes the private network address, the private network port, the target public network address and the target port block to the target CGN card based on the identity information of the target CGN card, generates a flow redirection rule for the target user terminal, where the flow redirection rule is used to instruct the BRAS DP device to redirect the received data flow of the target user terminal to the target CGN card so that the target CGN card performs address translation for the data flow of the target user terminal based on the private network address, the private network port, the target public network address and the target port block.

Figure 6:
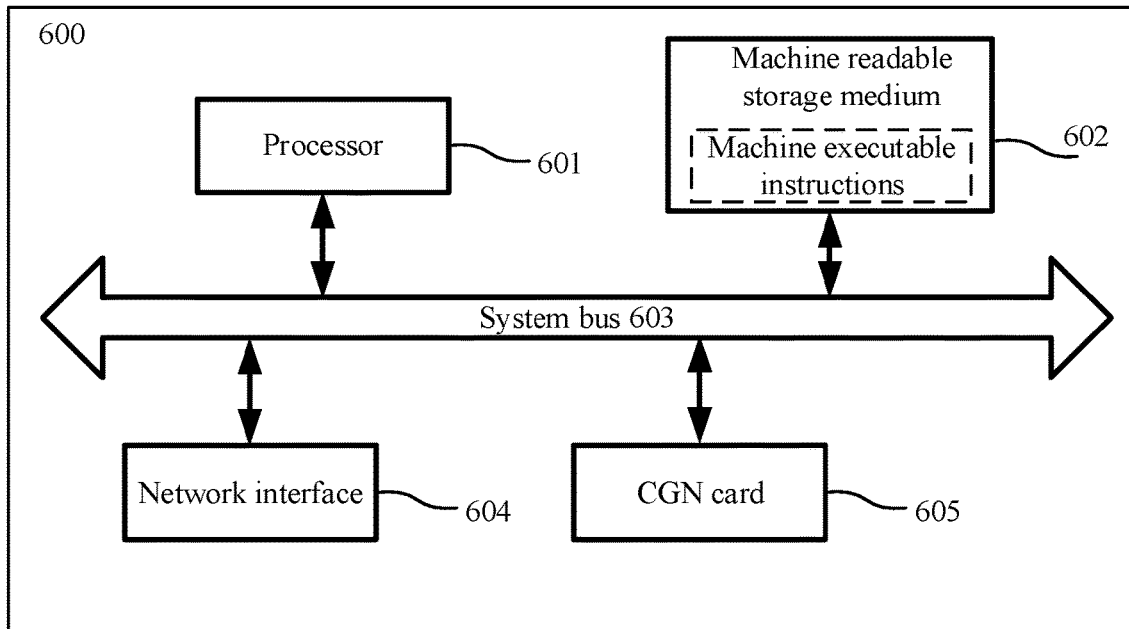
FIG. 6 is a schematic diagram illustrating a hardware structure of an apparatus for separating CGN forwarding and control according to another example of the present disclosure.

FIG. 6 is a schematic diagram illustrating a hardware structure of an apparatus 600 for separating CGN forwarding and control according to another example of the present disclosure. The apparatus 600 may be applied to a BRAS DP device. The apparatus may include a processor 601, a machine readable storage medium 602 storing machine executable instructions, a network interface 604, and a CGN card 605. The processor 601, the machine readable storage medium 602, the network interface 604 and the CGN card 605 may communicate with each other via a system bus 603. The apparatus 600 may, for example, communicate with a user side or a BRAS CP device via the network interface 604. As shown in FIG. 6, both the numbers of the network interface 604 and the CGN card 605 are shown one for simplicity. However, the apparatus 600 may include a plurality of network interfaces 604 and a plurality of CGN cards 605.

The machine readable storage medium 602 mentioned herein may be any electronic, magnetic, optical or other physical storage devices and may contain or store information such as executable instructions, data and so on. For example, the machine readable storage medium may be volatile or non-volatile such as a Radom Access Memory (RAM), a flash memory, a storage drive (e.g. hard disk drive), a solid state hard disk, any type of storage disk (e.g., optical disk, Digital Video Disk (DVD)), or a similar storage medium, or a combination thereof.

Figure 7:
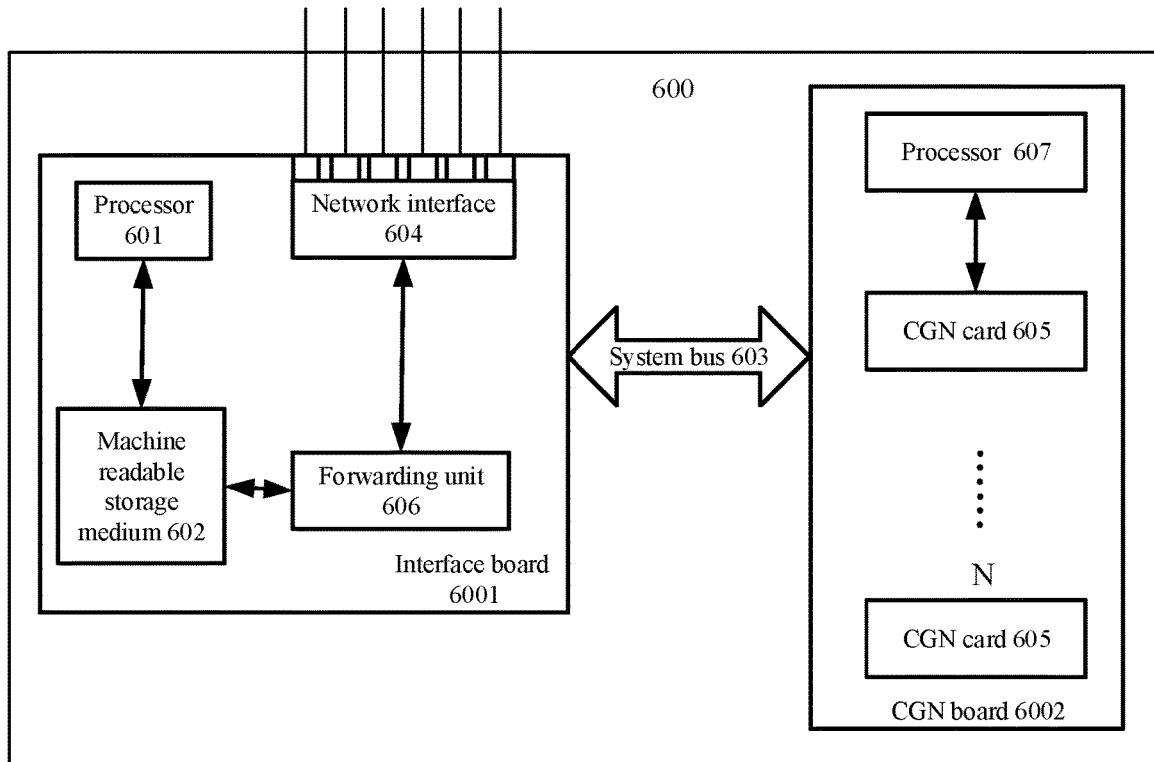
FIG. 7 is a schematic diagram illustrating a hardware structure of an apparatus for separating CGN forwarding and control according to still another example of the present disclosure.

FIG. 7 is a schematic diagram illustrating another hardware structure of the apparatus 600 for separating CGN forwarding and control shown in FIG. 6. Based on the structure shown in FIG. 6, FIG. 7 illustrates another specific hardware implementation of the apparatus 600.

As shown in FIG. 7, the apparatus 600 may include an interface board 6001 and a CGN board 6002. When a first user terminal goes online, for example, when the first user terminal accesses a BRAS DP device, a BRAS CP device may generate flow redirection information for redirecting a target data flow. The flow redirection information may be distributed to the processor 601 via the network interface 604 on the interface board 6001 and stored in the machine readable storage medium 602. The flow redirection information can be generated only when the first user terminal of a same network segment goes online. Subsequently, when different user terminals of the same network segment go online, the BRAS CP device may generate flow table information respectively for different user terminals including the first user terminal. The interface board 6001 may receive the flow table information distributed by the BRAS CP device via the network interface 604. The processor 601 may parse out a forwarding entry and CGN configuration information for a target user terminal from the flow table information, where the CGN configuration information includes a private network address, a private network port, a target public network address and a target port block of a target user terminal, and identity information of a target CGN card. The parsed forwarding entry may be stored in the machine readable storage medium 602 to subsequently be used for instructing a forwarding unit 606 to forward a packet. The forwarding unit 606 may be implemented by, for example, a forwarding chip. At the same time, the processor 601 may distribute the CGN configuration information to a processor 607 of the CGN board 6002 and then the processor 607 may distribute the CGN configuration information to the target CGN card 605. The target CGN card may store a corresponding relationship among a private network address, a private network port, a target public network address and a target port block. The processor 601 may also generate a flow redirection rule for a target user terminal based on the flow redirection information distributed by the BRAS CP device so as to redirect the data flow of the target user terminal received by the interface board 6001 to the target CGN card 605 so that the target CGN card 605 performs address translation for the data flow of the target user terminal based on the stored corresponding relationship. It needs to be noted that only the example of generating the flow redirection rule by the processor 601 is illustrated herein. In other implementations of the present disclosure, the BRAS CP device may also generate the flow redirection rule and distribute the flow redirection rule to the processor 601. The operations of the processor 601 may be realized by the processor 601 by executing machine executable instructions on the machine readable storage medium 602. The structures of the interface board 6001 and the CGN board 6002 shown in FIG. 7 are only illustrative and not limited herein and may include other hardware components, and changed, modified or equivalent structures of different components.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of separating carrier-grade network address translation (CGN) forwarding and control, comprising:
   assigning, by a Broadband Remote Access Server (BRAS) control plane (CP) device, a private network address and a private network port to a target user terminal accessing a BRAS data plane (DP) device when detecting that the target user terminal is successfully authenticated;
   selecting, by the BRAS CP device, a target CGN card from one or more CGN cards in the BRAS DP device;
   selecting, by the BRAS CP device, a target public network address and a target port block from idle public network addresses and port blocks on the target CGN card;
   sending, by the BRAS CP device, CGN configuration information for the target user terminal to the BRAS DP device, wherein the CGN configuration information comprises identity information of the target CGN card, the private network address, the private network port, the target public network address and the target port block,
   wherein, before selecting the target public network address and the target port block from the idle public network addresses and the port blocks on the target CGN card, determining, by the BRAS CP device, whether there are idle public network addresses and port blocks on the target CGN card.

2. The method according to claim 1, wherein sending the CGN configuration information for the target user terminal to the BRAS DP device comprises:
   sending, by the BRAS CP device, a user flow table for the target user terminal to the BRAS DP device, wherein the CGN configuration information is carried in the user flow table.

3. The method according to claim 1, further comprising:
   when there are idle public network addresses and port blocks on the target CGN card,
      selecting, by the BRAS CP device, the target public network address and the target port block from the idle public network addresses and the port blocks on the target CGN card; and
   when there are no idle public network address and port block on the target CGN card,
      selecting, by the BRAS CP device, idle public network addresses for the target CGN card from a public network address pool based on a preconfigured allocation granularity and
      assigning, by the BRAS CP device, the selected idle public network addresses and port blocks corresponding to the selected idle public network addresses to the target CGN card.

4. The method according to claim 1, wherein selecting the target CGN card from one or more CGN cards in the BRAS DP device comprises:
   selecting, by the BRAS CP device, the target CGN card from the CGN cards in the BRAS DP device in a polling manner when there are a plurality of CGN cards in the BRAS DP device.

5. The method according to claim 4, after selecting the target CGN card from the CGN cards in the BRAS DP device in the polling manner, further comprising:
   recording, by the BRAS CP device, a corresponding relationship between a target interface and the selected CGN card, wherein the target user terminal accesses the BRAS DP device via the target interface on the BRAS DP device.

6. The method according to claim 5, wherein,
   when detecting that another target user terminal accessing the BRAS DP device via the target interface is successfully authenticated,
      selecting the target CGN card for the other target user terminal comprises:
         selecting a CGN card corresponding to the target interface as the target CGN card based on the corresponding relationship.

7. An apparatus for separating carrier-grade network address translation (CGN) forwarding and control, comprising:
   a processor, and
   a machine-readable storage medium storing machine executable instructions wherein by executing the machine executable instructions, the processor is caused to:
      assign, by a Broadband Remote Access Server (BRAS) control plane (CP) device, a private network address and a private network port to a target user terminal accessing a BRAS data plane (DP) device when detecting that the target user terminal is successfully authenticated;
      select, by the BRAS CP device, a target CGN card from one or more CGN cards in the BRAS DP device;
      select, by the BRAS CP device, a target public network address and a target port block from idle public network addresses and port blocks on the target CGN card; and
      send, by the BRAS CP device, CGN configuration information for the target user terminal to the BRAS DP device, wherein the CGN configuration information comprises identity information of the target CGN card, the private network address, the private network port, the target public network address and the target port block,
      wherein, before selecting the target public network address and the target port block from the idle public network addresses and the port blocks on the target CGN card, determining, by the BRAS CP device, whether there are idle public network addresses and port blocks on the target CGN card.

8. The apparatus according to claim 7, wherein when sending the CGN configuration information for the target user terminal to the BRAS DP device, the processor is further caused by the machine executable instructions to:
   send a user flow table for the target user terminal to the BRAS DP device, wherein the CGN configuration information is carried in the user flow table.

9. The apparatus according to claim 7, wherein the processor is further caused by the machine executable instructions to:
   when there are idle public network addresses and port blocks on the target CGN card, select the target public network address and the target port block from the idle public network addresses and the port blocks on the target CGN card; and
   when there are no idle public network addresses and port blocks on the target CGN card, select idle public network addresses for the target CGN card from a public network address pool based on a preconfigured allocation granularity, and assign the selected idle public network addresses and port blocks corresponding to the selected idle public network addresses to the target CGN card.

10. The apparatus according to claim 7, wherein when selecting the target CGN card from one or more CGN cards in the BRAS DP device, the processor is further caused by the machine executable instructions to:
    select the target CGN card from the CGN cards in the BRAS DP device in a polling manner when there are a plurality of CGN cards in the BRAS DP device.

11. The apparatus according to claim 10, wherein after selecting the target CGN card from the CGN cards in the BRAS DP device in a polling manner, the processor is further caused by the machine executable instructions to:
    record a corresponding relationship between a target interface and the selected CGN card, wherein the target user terminal accesses the BRAS DP device via the target interface on the BRAS DP device.

12. The apparatus according to claim 11, wherein when detecting that another target user terminal accessing the BRAS DP device via the target interface is successfully authenticated,
    selecting a target CGN card for the other target user terminal comprises:
        selecting a CGN card corresponding to the target interface as the target CGN card based on the corresponding relationship.

* * * * *